US010067899B2

(12) United States Patent
Hsieh et al.

(10) Patent No.: US 10,067,899 B2
(45) Date of Patent: Sep. 4, 2018

(54) STORAGE SYSTEM AND DATA TRANSFERRING METHOD THEREOF

(71) Applicant: Wistron Corporation, New Taipei (TW)

(72) Inventors: Cheng-Kuang Hsieh, New Taipei (TW); Chih-Hung Chen, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 489 days.

(21) Appl. No.: 14/516,582

(22) Filed: Oct. 17, 2014

(65) Prior Publication Data

US 2016/0019177 A1    Jan. 21, 2016

(30) Foreign Application Priority Data

Jul. 21, 2014 (TW) .............................. 103124962 A

(51) Int. Cl.
| | |
|---|---|
| G06F 3/00 | (2006.01) |
| G06F 13/00 | (2006.01) |
| H05K 7/10 | (2006.01) |
| G06F 15/16 | (2006.01) |
| G06F 13/40 | (2006.01) |
| G06F 11/30 | (2006.01) |
| H04L 1/18 | (2006.01) |

(52) U.S. Cl.
CPC ...... *G06F 13/4022* (2013.01); *G06F 11/3055* (2013.01); *G06F 13/4068* (2013.01); *H04L 1/1858* (2013.01)

(58) Field of Classification Search
USPC .... 710/14–15, 100, 301, 308, 316; 709/200, 709/203; 370/216, 238
See application file for complete search history.

(56) References Cited

U.S. PATENT DOCUMENTS 6,141,765 A * 10/2000 Sherman ............. G06F 13/4217
                                                  713/400
6,484,032 B1 * 11/2002 Okada .................. H04W 36/32
                                                   455/436

(Continued)

OTHER PUBLICATIONS

"Office Action of Taiwan Counterpart Application" with English translation, dated Aug. 31, 2015, p. 1-p. 8.

*Primary Examiner* — Farley Abad
*Assistant Examiner* — Henry W Yu
(74) *Attorney, Agent, or Firm* — Winston Hsu

(57) ABSTRACT

A storage system and a data transferring method thereof are provided. The storage system includes at least one drawer storage device, a backplane board and a processing unit. Each of the drawer storage devices accommodates at least one storage device, and has a first connecting interface. The backplane board has a second connecting interface. The backplane board and each of the drawer storage devices are connected with each other through a transmission line. The first connecting interface and the second connecting interface are connected or isolated with each other. The processing unit detects a connection status between the first connecting interface and the second connecting interface, and determines to transfer data through at least one of the transmission line and a connection between the first connecting interface and the second connecting interface according to the connection status.

11 Claims, 4 Drawing Sheets

(56) References Cited

U.S. PATENT DOCUMENTS

| | | | |
|---|---|---|---|
| 6,507,920 B1* | 1/2003 | Truebenbach | G01R 31/31722 710/100 |
| 6,606,667 B1* | 8/2003 | Hermann | H04J 3/085 370/216 |
| 6,715,019 B1* | 3/2004 | Benson | G06F 13/4081 710/14 |
| 7,089,345 B1* | 8/2006 | Lynn | G06F 3/0617 710/316 |
| 7,107,337 B2* | 9/2006 | Barrow | G06F 13/38 709/200 |
| 7,487,283 B2* | 2/2009 | Sivertsen | G06F 13/409 710/301 |
| 8,107,245 B1* | 1/2012 | Krishnamoorthy | H01L 23/48 257/724 |
| 9,158,333 B1* | 10/2015 | Froment | H04M 1/72527 |
| 2007/0233781 A1* | 10/2007 | Starr | G11B 33/126 709/203 |
| 2013/0223204 A1* | 8/2013 | Angst | H04L 41/0668 370/218 |
| 2015/0006814 A1* | 1/2015 | Phong | G06F 3/0625 711/114 |
| 2015/0281088 A1* | 10/2015 | Wu | H04L 45/125 370/238 |

* cited by examiner

STORAGE SYSTEM AND DATA TRANSFERRING METHOD THEREOF

CROSS-REFERENCE TO RELATED APPLICATION

This application claims the priority benefit of Taiwan application serial no. 103124962, filed on Jul. 21, 2014. The entirety of the above-mentioned patent application is hereby incorporated by reference herein and made a part of this specification.

BACKGROUND OF THE INVENTION

Field of the Invention

The invention relates to a data transferring method, and more particularly, relates to a storage system capable of adaptively determining a data transmission path and a data transferring method thereof.

Description of Related Art

In recent years, cloud technologies have become popularized each day with developments of network and information services. In addition to cloud services such as providing a network storage space or a printing service, a core server in a cloud system is also capable of sharing various resources in the network environment to users. To realize aforementioned functions, amount of hard disks to be supported by a storage system of the server is gradually increased. Also, in order to accommodate more hard disks, a depth of a chassis of the storage system is accordingly deeper. Under this circumstance, a drawer storage device and a backplane board in the storage system also need to execute stable data transmission through faster transmission interfaces.

In conventional art, a SATA (Serial Advanced Technology Attachment) transmission interface is used to transfer data between the drawer storage device and the backplane board. However, as a length of the transmission line gets longer, intensity attenuation of a transmission signal is getting more serious, which results in degradation of signal quality in the storage system. To solve aforementioned problem, a conventional method is to compensate the transmission signal through an additional drive chip, but this method may generate more costs as well as more power consumptions. On the other hand, a longer transmission line also leads to more power loss. Although the transmission line with thicker thread diameter is capable of reducing impedance in transmission, the cost thereof may be increased accordingly. Therefore, it is an important issue to be solved as how to improve data transmission quality while enhancing transmission performance.

SUMMARY OF THE INVENTION

Accordingly, the invention is directed to a storage system and a data transferring method thereof. Two connecting interfaces are provided between a drawer storage device and a backplane board in the storage system. Accordingly, the connection status between the drawer storage device and the backplane board may be used to adaptively determine how to transfer data through the two connecting interfaces, so as to maintain transmission data quality, improve stability of the storage system and enhance transmission performance.

The invention provides a storage system. The storage system includes at least one drawer storage device, a backplane board and a processing unit. Each of the drawer storage devices accommodates at least one storage device, and each of the drawer storage devices has a first connecting interface. The backplane board has a second connecting interface. The backplane board and each of the drawer storage devices are connected with each other through a transmission line, and the first connecting interface and the second connecting interface are connected or isolated with each other. The processing unit is coupled to the drawer storage device and the backplane board, and configured to detect a connection status between the first connecting interface and the second connecting interface, and determine to transfer data through at least one of the transmission line and a connection between the first connecting interface and the second connecting interface according to the connection status.

On the other hand, the invention provides a data transferring method of a storage system. The storage system includes at least one drawer storage device and a backplane board. Each of the drawer storage devices accommodates at least one storage device, and each of the drawer storage devices has a first connecting interface. The backplane board has a second connecting interface. The backplane board and each of the drawer storage devices are connected with each other through a transmission line. The first connecting interface and the second connecting interface are connected or isolated with each other. The data transferring method includes the following steps: detecting a connection status between the first connecting interface and the second connecting interface; and, determining to transfer data through at least one of the transmission line and a connection between the first connecting interface and the second connecting interface according to the connection status.

Based on above, the storage system proposed according to the embodiments of the invention and the data transferring method thereof are capable of providing two different connecting interfaces between the drawer storage device and the backplane board in the storage system, and detecting whether the first connecting interface of the drawer storage device and the second connecting interface of the backplane board are connected or isolated with each other, so as to determine to transfer data through at least one of the transmission line and the connection between the first connecting interface and the second connecting interface. Accordingly, the connection status between the drawer storage device and the backplane board may be used to adaptively determine how to transfer data through aforesaid two transmission paths, so as to maintain transmission data quality, improve stability of the storage system and enhance transmission performance.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
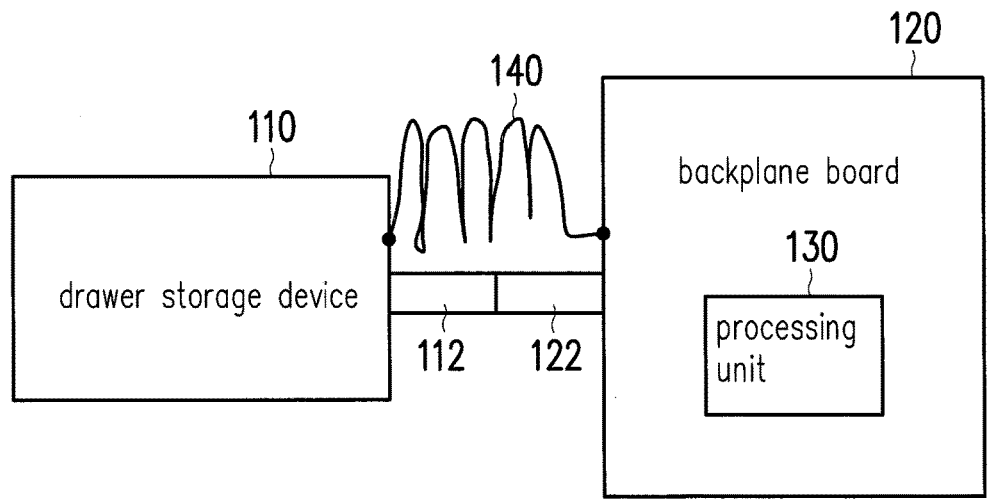
FIG. 1A is a block schematic diagram illustrating a storage system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

In response to demands for accommodating mass amount of storage devices (e.g., hard disks), a depth of a chassis of a storage system is getting deeper. If the storage system transfers data through a transmission interface which adopts a transmission line, a length of the transmission line for connecting the drawer storage device with the backplane board is accordingly longer. In order to solve the problem of quality deterioration in data transmission due to the transmission being too long, in a storage system proposed according to embodiments of the invention, two different connecting interfaces are provided between the drawer storage device and the backplane board. In addition to the transmission line for providing data transmission in long range, the drawer storage device and backplane board may also transfer data in close range and high speed through a direct contact between connectors. Further, according to a contact status between the drawer storage device and the backplane board, the embodiments of the invention are capable of adaptively determining how to transfer data by using aforesaid two connecting interfaces, so as to maintain transmission data quality, improve stability of the storage system and enhance transmission performance.

Figure 1B:
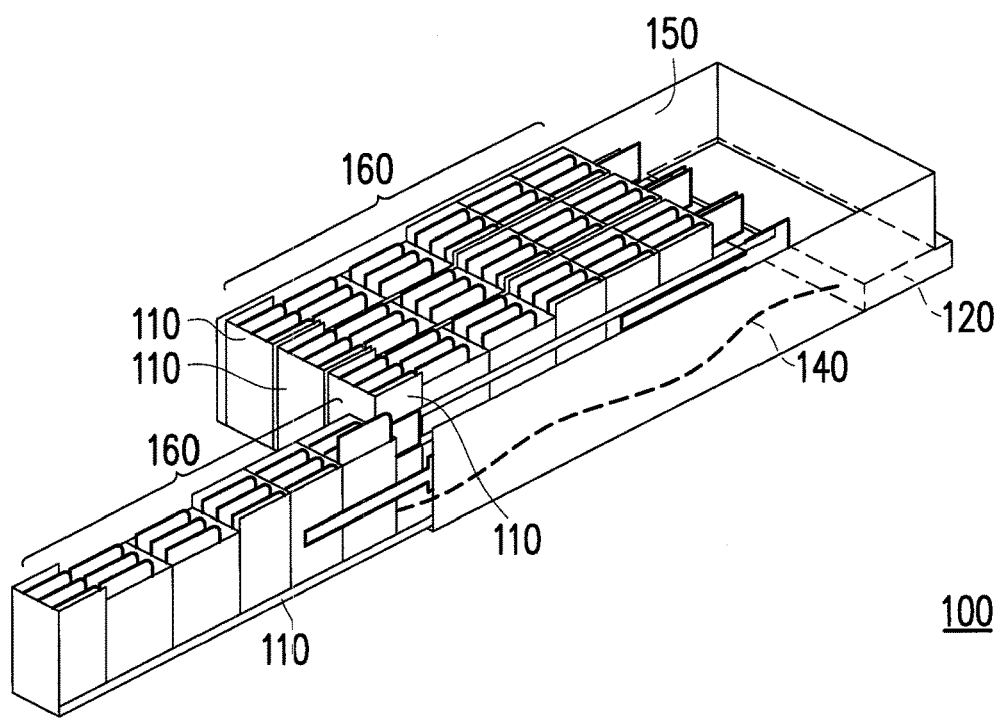
FIG. 1B is a structure diagram illustrating devices of the storage system according to an embodiment of the invention.

FIG. 1A is a block schematic diagram illustrating a storage system according to an embodiment of the invention, and FIG. 1B is a structure diagram illustrating devices of the storage system according to an embodiment of the invention. Referring to FIG. 1A and FIG. 1B, a storage system 100 includes at least one drawer storage device 110, a backplane board 120 and a processing unit 130. Although FIG. 1A only uses one drawer storage device 110 to describe the present embodiment, the storage system 100 depicted in FIG. 1B may include a plurality of the drawer storage devices 110 (e.g., 4 of them). These drawer storage devices 110 may be completely identical to one another, and a number of drawer storage devices 110 may be adaptively adjusted based on demands of those applying the present embodiment. The storage system 100 is, for example, a rack mount server system, a disc array system or a data center.

The drawer storage device 110 is, for example, a removable hard disk rack. The removable hard disk rack may be completely pulled out from a front end of a chassis 150 of the storage system 100 in a manner of sliding relative to slide rails by using rollers. The drawer storage device 110 is capable of accommodating at least one storage device 160. The storage device is, for example, a hard disk that is disposed in the drawer storage device 110 in a manner of plugging.

The backplane board 120 and the drawer storage device 110 are connected with each other through a transmission line 104. When the drawer storage device 110 are completed pulled out from the front end of the chassis 150, the backplane board 120 and the drawer storage device 110 are still connected with each other through the transmission line 140. The transmission line 140 transfers data through a transmission specification such as SATA (Serial Advanced Technology Attachment) SATA or SAS (Serial Attached SCSI).

In addition, the drawer storage device 110 includes a first connecting interface 112, and the backplane board 120 includes a second connecting interface 122. The first connecting interface 112 and the second connecting interface 122 are connecting interfaces with a transmission specification that is identical or compatible to a high speed transmission such as SAS (Serial Attached SCSI) or PCIe/Fiber Channel/infiniband, and a connection status between the first connecting interface 112 and the second connecting interface 122 includes either they are "connected with each other" or "isolated with each other". It should be noted that, in the present embodiment, the phrase "connected with each other" refers to a condition that the drawer storage device 110 and the backplane board 120 are in a direct connection (in manners of docket or mount) through connectors matching the transmission specification of the first connecting interface 112 and the second connecting interface 122. On the other and, the phrase "isolated with each other" refers to conditions other than the condition of the direct connection. For example, when the drawer storage device 110 is pulled out from the front end of the chassis 150, aforesaid connectors cannot be in the condition of the direction connection. In this case, the first connecting interface 112 and the second connecting interface 122 are isolated with each other.

It is worth mentioning that, since the first connecting interface 112 and the second connecting interface 122 transfer data through the direct contact, these connecting interfaces may be designed to include greater transmission bandwidth in order to transfer data in close range and high speed. On the other hand, the transmission specification of the transmission line 140 may be designed to include less transmission bandwidth, so that transmission line 140 with longer length can mitigate influences of data fade-out due to a transmission range being overly long.

The processing unit 130 is coupled to the drawer storage device 110 and the backplane board 120. The processing unit 130 may be a central processing unit (CPU) or other programmable devices for general purpose or special purpose such as a microprocessor and a digital signal processor (DSP), a programmable controller, an application specific integrated circuit (ASIC) or other similar elements or a combination of above-mentioned elements. By using the transmission line 140, a connection between the first connecting interface 112 and the second connecting interface 122 or other paths for transmitting a control signal, the processing unit 130 is capable of detecting the connection status between the first connecting interface 112 and the second connecting interface 122 and adaptively determining a data transmission path, so as to realize the data transferring method according to the embodiments of the invention.

Figure 2:
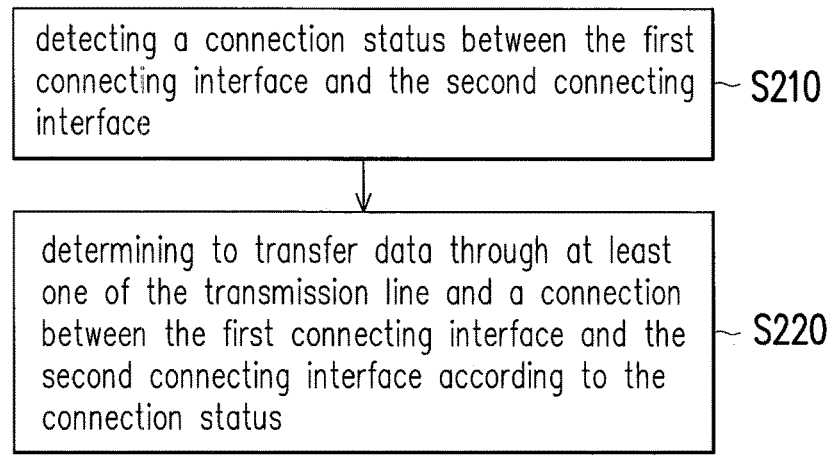
FIG. 2 is a flowchart illustrating a data transferring method of a storage system according to an embodiment of the invention.

Based on a system architecture as described above, embodiments are provided below to describe the data transferring method of the storage system proposed according to the embodiments of the invention. Referring to FIG. 2, FIG. 2 is a flowchart illustrating a data transferring method of a storage system according to an embodiment of the invention, and adapted to the storage system 100 of FIG. 1A and FIG. 1B. Detailed steps of the method are described below with reference to each element in FIG. 1A and FIG. 1B.

In step S210, the processing unit 130 detects a connection status between the first connecting interface 112 and the second connecting interface 122. Subsequently, in step S220, the processing unit 130 determines to transfer data through at least one of the transmission line 140 and a connection between the first connecting interface 112 and the second connecting interface 122 according to the connection status. Specifically, according to whether the first connecting interface 112 and the second connecting interface 122 are connected or isolated with each other, the processing unit 130 may determine how the storage system 100 transfers data through the transmission line 140 and the connection between the first connecting interface 112 and the second connecting interface 122.

In an embodiment, the processing unit 130 may select to transfer data through one of transmission paths respectively provided by the transmission line 140 and the connection between the first connecting interface 112 and the second connecting interface 122. Specifically, when the first connecting interface 112 and the second connecting interface 122 are isolated with each other, the processing unit 130 may determine to transfer data through the transmission line 140; and when the first connecting interface 112 and the second connecting interface 122 are connected with each other, the processing unit 130 may determine to transfer data through the connection between the first connecting interface 112 and the second connecting interface 122.

Figure 3:
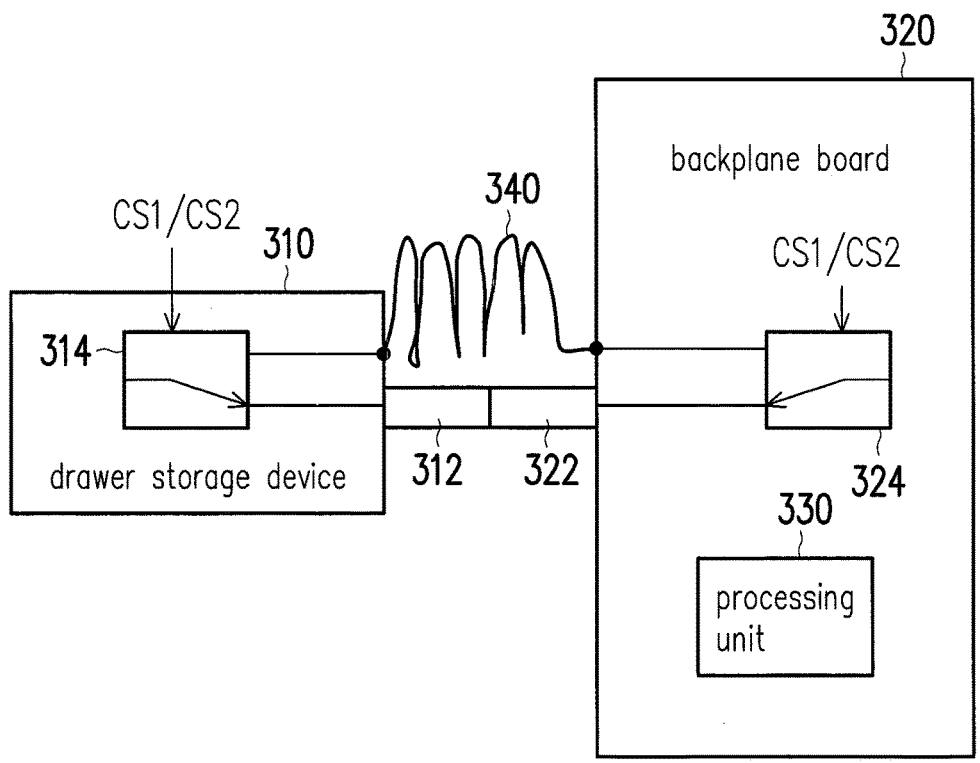
FIG. 3 is a block schematic diagram illustrating a storage system according to an embodiment of the invention.

Herein, FIG. 3 is used for further description. Referring to FIG. 3, a storage system 300 includes a drawer storage device 310, a backplane board 320 and a processing unit 330. The drawer storage device 310 and the backplane board 320 are connected with each other through a transmission line 340. The drawer storage device 310 and the backplane board 320 include a first connecting interface 312 and a second connecting interface 322 respectively, and the first connecting interface 312 and the second connecting interface 322 are connected or isolated with each other. In addition, the drawer storage device 310 and the backplane board 320 include a first switch 314 and a second switch 324 respectively, which are configured to switch a data transmission path of the storage system 300 to the transmission line 340 or to the connection between the first connecting interface 312 and the second connecting interface 322. The first and second switches 314 and 324 are realized in ways of hardware or software for example, which are not particularly limited in the invention.

Based on a system architecture of FIG. 3, the processing unit 330 may detect a connection status between the first connecting interface 312 and the second connecting interface 322 to be either connected or isolated with each others. When the first connecting interface 312 and the second connecting interface 322 are isolated with each other, the processing unit 330 may switch the first and second switches 314 and 324 in order to select the transmission line 340 for transferring data. When the first connecting interface 312 and the second connecting interface 322 are connected with each other, the processing unit 330 may switch the first and second switches 314 and 324 in order to select the connection between the first connecting interface 312 and the second connecting interface 322 for transferring data.

For example, the processing unit 330 detects whether the first connecting interface 312 and the second connecting interface 322 are connected or isolated with each other, so as to generate a first control signal CS1 and a second control signal CS2 accordingly. Based on the first and second control signals CS1 and CS2, the processing unit 330 may switch the first and second switches 314 and 324, so as to select one of the transmission line 340 or the connection between the first connecting interface 312 and the second connecting interface 322 to serve as the data transmission path of the storage system 300.

Besides selecting one of the transmission paths for transferring data, when the first connecting interface 112 and the second connecting interface 122 are connected with each other, the processing unit 130 may also transfer data through both the transmission line and the connection between the first connecting interface 112 and the second connecting interface 122 at the same time. Specifically, in another embodiment, when the first connecting interface 112 and the second connecting interface 122 are isolated with each other, the processing unit 130 may determine to transfer data through the transmission line 140; and when the first connecting interface 112 and the second connecting interface 122 are connected with each other, the processing unit 130 may determine to transfer data through a combination of the connection between the first connecting interface 112 and the second connecting interface 122 together with the transmission line 140.

Figure 4:
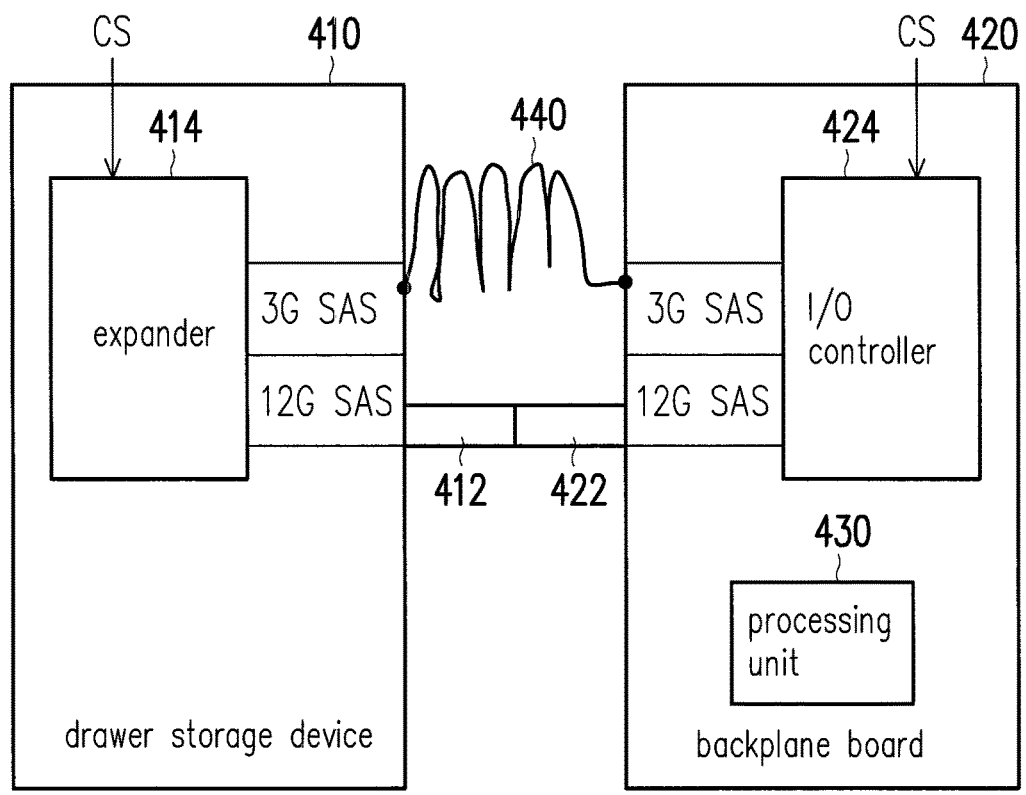
FIG. 4 is a block schematic diagram illustrating a storage system according to an embodiment of the invention.

Taking a storage system 400 of FIG. 4 as an example, in which the storage system 400 includes a drawer storage device 410, a backplane 420 and a processing unit 430. The drawer storage device 410 and the backplane board 420 are connected with each other through a transmission line 440. The drawer storage device 410 and the backplane board 420 include a first connecting interface 412 and a second connecting interface 422 respectively, and the first connecting interface 412 and the second connecting interface 422 are connected or isolated with each other.

Based on a system architecture of FIG. 4, the processing unit 430 may detect a connection status between the first connecting interface 412 and the second connecting interface 422 to be either connected or isolated with each others. When the first connecting interface 412 and the second connecting interface 422 are isolated with each other, the processing unit 430 may determine to transfer data through the transmission line 440; and when the first connecting interface 412 and the second connecting interface 422 are connected with each other, the processing unit 430 may determine to transfer data through both the connection between the first connecting interface 412 and the second connecting interlace 422 together with the transmission line 440 at the same time.

It should be noted that, in an embodiment, when the processing unit 430 determines to transfer data through the combination of the connection between the first connecting interface 412 and the second connecting interface 422 together with the transmission line 440, the processing unit 130 may further distribute data amounts for the transmission line 440 and the connection between the first connecting interface 412 and the second connecting interface 422 to transfer data according to a transmission speed ratio of the transmission line 440 and the connection between the first connecting interface 412 and the second connecting interface 422.

Specifically, the processing unit 430 distributes the data amount transferred in each of the transmission paths by using, for example, an expander 414 in the drawer storage device 410 and an I/O controller 424 in the backplane board 420. For instance, in the case that the transmission line 440 is in 3G transmission speed mode (i.e., a transmission speed thereof is 3 Gbit/s) of the SAS and the connection between the first connecting interface 412 and the second connecting interface 422 is in 12G transmission speed mode (i.e., a transmission speed thereof is 12 Gbit/s) of the SAS, the processing unit 430 may send a control signal CS to the expander 414 and the I/O controller 424 respectively. The control signal CS may correspondingly distribute the data amounts in accordance with the transmission speed ratio in aforesaid specifications as being 1:4. By adjusting the connection between the first connecting interface 412 and the second connecting interface 422 having higher transmission speed to transfer greater data amount, transmission performance of the storage system 400 may be enhanced. Those applying the present embodiment may adaptively adjust the data amount in each of the transmission path based on loading in actual transmission.

Accordingly, when the first connecting interface of the drawer storage device and the second connecting interface of the backplane board are connected with each other, the storage system is capable of realizing the data transmission in close range and high speed by using the connection between the first connecting interface and the second connecting interface. Further, when the first connecting interface and the second connecting interface are isolated with each other, the transmission line may be used to transfer data without cutting off the data transmission path between the drawer storage device and the backplane board. As a result, not only is transmission data quality maintained, stability of the storage system is improved and transmission performance is also enhanced.

Hereinafter, a data transferring method of a storage system according to embodiments of the invention are described in detail by using FIG. 5 as an example together with each element in the storage system 100 of FIG. 1. Those applying the present embodiment may adaptively adjust each step in FIG. 5 based on actual situation.

In step S510, the first connecting interface 112 of the drawer storage device 110 and the second connecting interface 122 of the backplane board 120 are connected with each other. In this case, the storage system 100 includes two data transmission paths provided by the transmission line 140 and the connection between the first connecting interface 112 and the second connecting interface 122.

In step S520, the processing unit 130 detects a connection status between the first connecting interface 112 and the second connecting interface 122. In step S530, the processing unit 130 determines whether the connection between the first connecting interface 112 and the second connecting interface 122 is cut off. Specifically, when the drawer storage device 110 is pulled out from the chassis, so that the connection between the first connecting interface 112 and the second connecting interface 122 is cut off to isolate them from each other, the processing unit 130 may receive a corresponding interrupt signal through a general purpose input/output (PIO) for example. Therefore, according to whether aforesaid interrupt signal is received, the processing unit 130 may determine whether the connection between the first connecting interface 112 and the second connecting interface 122 is cut off.

When it is determine that said connection is cut off, in some embodiments, the processing unit 130 may execute steps S520 and S530 repeatedly to confirm whether said connection is cut off once again, so as to avoid misjudgments. When it is determined that said connection is not cut off, returning back to step S520.

It should be noted that, the first connecting interface 112 and the second connecting interface 122 may not support the function of hot swap. Therefore, when it is determined that the connection between the first connecting interface 112 and the second connecting interface 122 is cut off, in order to avoid data loss while the storage system 100 is transferring data through the first connecting interface 112 and the second connecting interface 122 at the time, in step S540, the processing unit 130 may further determine whether a data transmission action is executed between the first connecting interface 112 and the second connecting interface 122. When it is determined that the data transmission action is executed, in step S550, the processing unit 130 may send a data retransmission signal to an external circuit for making the external circuit to transfer data through the transmission line 140. Herein, the external circuit is, for example, a main system processor of the storage system 100. When the data retransmission signal is received, the main system processor may store upcoming or pending data to be transferred through the connection between the first connecting interface 112 and the second connecting interface 122 in a queue, so that the transmission line 140 may retransmit aforesaid data.

When it is determined that the data transmission action is not executed, proceeding to step S560, in which the processing unit 130 determines to transfer data through the transmission line 140 according to the connection status of the first connecting interface 112 and the second connecting interface 122 as being isolated with each other.

The processes of steps S510 to S560 refer to operation of the processing unit 130 for cutting the connection between the first connecting interface 112 and the second connecting interface 122 and related actions thereof when the first connecting interface 112 and the second connecting interface 122 are changed from being connected with each other to being isolated with each other. In the case that the first connecting interface 112 and the second connecting interface 122 are changed from being isolated with each other to being connected with each other, in the processes of step S560 to 590, the processing unit 130 is capable of correspondingly establishing the connection of the first connecting interface 112 and the second connecting interface 122 and related settings thereof.

Figure 5:
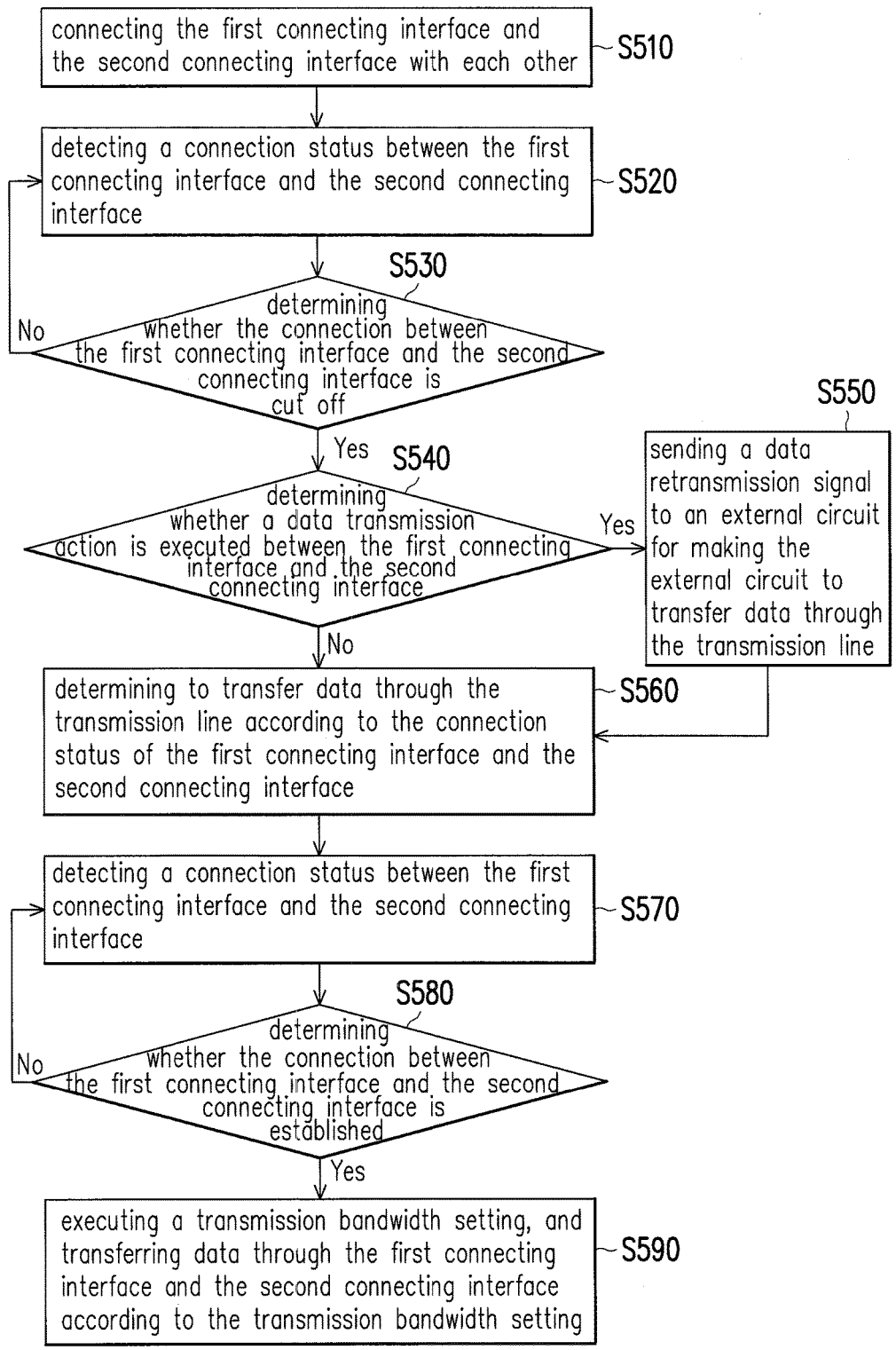
FIG. 5 is a flowchart illustrating a data transferring method of a storage system according to an embodiment of the invention.

Referring back to processes of FIG. 5, when the first connecting interface 112 and the second connecting interface 122 are isolated with each other (corresponding to step S560), in step S570, the processing unit 130 detects the connection status between the first connecting interface 112 and the second connecting interface 122. Then, in step S580, the processing unit 130 determines whether the connection between the first connecting interface 112 and the second connecting interface 122 is established. A method of the processing unit 130 for detecting whether the connection is established is similar to the embodiment of steps S520 and S530, which are not repeated hereinafter.

When the processing unit 130 determines that the connection between the first connecting interface 112 and the second connecting interface 122 is established, in step S590, the processing unit 1:30 executes a transmission bandwidth setting, and transfers data through the first connecting interface 112 and the second connecting interface 122 according to the transmission bandwidth setting. Specifically, when the first connecting interface 112 and the second connecting interface 122 are connected with each other, the connection may be established through a handshaking protocol. The processing unit 130 determines an appropriate bandwidth according to, for example, the transmission specification which is compatible to the first connecting interface 112 and the second connecting interface 122, so as to set the connection between the first connecting interface 112 and the second connecting interface 122 as another data transmission path other than the transmission line 140.

In summary, the storage system proposed according to the embodiments of the invention and the data transferring method thereof are capable of providing two different connecting interfaces between the drawer storage device and the backplane board in the storage system, and detecting whether the first connecting interface of the drawer storage device and the second connecting interface of the backplane board are connected or isolated with each other, so as to determine to transfer data through at least one of the transmission line and the connection between the first connecting interface and the second connecting interface. Accordingly, the connection status between the drawer storage device and the backplane board may be used to adaptively determine how to transfer data through aforesaid two transmission paths, so as to maintain transmission data quality, improve stability of the storage system and enhance transmission performance.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A storage system, comprising:
   at least one drawer storage device, wherein each of the at least one drawer storage device accommodates at least one storage device, and each of the at least one drawer storage device has a first connecting interface;
   a backplane board, having a second connecting interface, wherein the backplane board and each of the at least one drawer storage device are connected with each other through a transmission line, and the first connecting interface and the second connecting interface are connected in a close transmission range and a high transmission speed or isolated in a long transmission range with each other; and
   a processing unit, coupled to the at least one drawer storage device and the backplane board, and configured to detect a connection status between the first connecting interface and the second connecting interface, and determine to transfer data through at least one of the transmission line in the long transmission range while the first connecting interface and the second connecting interface are not connected to each other and a connection between the first connecting interface and the second connecting interface in the close transmission range and the high transmission speed while the first connecting interface and the second connecting interface are connected to each other according to the connection status,
   wherein when determining to transfer data through the combination of the connection between the first connecting interface and the second connecting interface together with the transmission line, the processing unit distributes data amounts for the transmission line and the connection between the first connecting interface and the second connecting interface to transfer data according to a transmission speed ratio of the transmission line and the connection between the first connecting interface and the second connecting interface.

2. The storage system of claim 1, wherein the processing unit determines to transfer data through the transmission line when the first connecting interface and the second connecting interface are isolated with each other, and the processing unit determines to transfer data through the connection between the first connecting interface and the second connecting interface or a combination of the connection between the first connecting interface and the second connecting interface together with the transmission line when the first connecting interface and the second connecting interface are connected with each other.

3. The storage system of claim 1, wherein the processing unit further determines whether a data transmission action is executed between the first connecting interface and the second connecting interface when determining that the connection between the first connecting interface and the second connecting interface is cut off, and sends a data retransmission signal to an external circuit for making the external circuit to transfer data through the transmission line according to whether the data transmission action is executed.

4. The storage system of claim 3, wherein the processing unit sends the data retransmission signal to the external circuit for making the external circuit to transfer data through the transmission line when determining that data transmission action is executed.

5. The storage system of claim 1, wherein the processing unit executes a transmission bandwidth setting when determining that the connection between the first connecting interface and the second connecting interface is established, and transfers data through the connection between the first connecting interface and the second connecting interface according to the transmission bandwidth setting.

6. The storage system of claim 1, wherein each of the at least one drawer storage device and backplane board comprises a first switch and a second switch respectively, wherein
   the processing unit switches the first switch and the second switch to select the transmission line to transfer data when the first connecting interface and the second connecting interface are isolated with each other,
   the processing unit switches the first switch and the second switch to select the connection between the first connecting interface and the second connecting interface to transfer data when the first connecting interface and the second connecting interface are connected with each other.

7. A data transferring method of a storage system, and the storage system comprising at least one drawer storage device and a backplane board, wherein each of the at least one drawer storage device accommodates at least one storage device, each of the at least one drawer storage device has a first connecting interface, the backplane board has a second connecting interface, the backplane board and each of the at least one drawer storage device are connected with each other through a transmission line, the first connecting interface and the second connecting interface are connected in a close transmission range and a high transmission speed or isolated in a long transmission range with each other, and the data transferring method comprising:
   detecting a connection status between the first connecting interface and the second connecting interface; and
   determining to transfer data through at least one of the transmission line in the long transmission range while the first connecting interface and the second connecting interface are not connected to each other and a connection between the first connecting interface and the second connecting interface in the close transmission range and the high transmission speed while the first connecting interface and the second connecting interface are connected to each other according to the connection status, wherein the step of determining to transfer data through the at least one of the transmission line and the connection between the first connecting interface and the second connecting interface according to the connection status comprises:
when determining to transfer data through the combination of the connection between the first connecting interface and the second connecting interface together with the transmission line, distributing data amounts for the transmission line and the connection between the first connecting interface and the second connecting interface to transfer data according to a transmission speed ratio of the transmission line and the connection between the first connecting interface and the second connecting interface.

8. The data transferring method of the storage system of claim 7, wherein the step of determining to transfer data through the at least one of the transmission line and the connection between the first connecting interface and the second connecting interface according to the connection status further comprises:
determining to transfer data through the transmission line when the first connecting interface and the second connecting interface are isolated with each other; and
determining to transfer data through the connection between the first connecting interface and the second connecting interface or a combination of the connection between the first connecting interface and the second connecting interface together with the transmission line when the first connecting interface and the second connecting interface are connected with each other.

9. The data transferring method of the storage system of claim 7, further comprising:
determining whether a data transmission action is executed between the first connecting interface and the second connecting interface when determining that the connection between the first connecting interface and the second connecting interface is cut off; and
sending a data retransmission signal to an external circuit for making the external circuit to transfer data through the transmission line according to whether the data transmission action is executed.

10. The data transferring method of the storage system of claim 9, wherein the step of sending the data retransmission signal to the external circuit for making the external circuit to transfer data through the transmission line according to whether the data transmission action is executed comprises:
sending the data retransmission signal to the external circuit for making the external circuit to transfer data through the transmission line when determining that data transmission action is executed.

11. The data transferring method of the storage system of claim 7, further comprising:
executing a transmission bandwidth setting when determining that the connection between the first connecting interface and the second connecting interface is established; and
transferring data through the connection between the first connecting interface and the second connecting interface according to the transmission bandwidth setting.

* * * * *